(12) United States Patent
Chang

(10) Patent No.: US 6,789,904 B2
(45) Date of Patent: Sep. 14, 2004

(54) ELECTRONIC APPARATUS WITH HEIGHT-ADJUSTING DEVICE

(75) Inventor: Lien-Wen Chang, Taipei (TW)

(73) Assignee: BenQ Corporation, Taoyuan (TW)

( * ) Notice: Subject to any disclaimer, the term of this patent is extended or adjusted under 35 U.S.C. 154(b) by 0 days.

(21) Appl. No.: 10/452,305

(22) Filed: Jun. 3, 2003

(65) Prior Publication Data

US 2003/0227601 A1 Dec. 11, 2003

(30) Foreign Application Priority Data

Jun. 11, 2002 (TW) ........................................ 91112658 A

(51) Int. Cl.⁷ ........................ G03B 21/22; G03B 21/14; F16M 11/24
(52) U.S. Cl. ...................... 353/119; 353/70; 248/188.2; 248/188.8
(58) Field of Search ................................. 348/373–376, 348/787–789, 825–831; 396/12, 419–428; 248/188.8, 649, 655, 677, 188.2, 188.3, 188.5, 408, 409, 423; 353/119, 69, 70, 122, 30–34

(56) References Cited

U.S. PATENT DOCUMENTS 1,280,741 A * 10/1918 Hunn .......................... 182/204
6,685,149 B1 * 2/2004 Chang ....................... 248/188.2
6,715,890 B2 * 4/2004 Huang et al. ................ 353/119
2002/0140909 A1 * 10/2002 Tanaka ......................... 353/70
2003/0227600 A1 * 12/2003 Chang ......................... 353/119

OTHER PUBLICATIONS

Merriam–Webster's Collegiate Dictionary, 1998, Merriam–Webster, 10ed, p. 32.*

* cited by examiner

Primary Examiner—Russell Adams
Assistant Examiner—Andrew Sever
(74) Attorney, Agent, or Firm—Michael D. Bednarek; Shaw Pittman LLP

(57) ABSTRACT

The present invention provides an electronic apparatus with a height-adjusting device. The electronic apparatus includes a housing and an adjusting device. The adjusting device disposed in the housing includes a connecting part, a leg, a push button, and a first elastic device. The connecting part connects with the housing and includes a groove and a rack. The leg is movably disposed in the groove and further includes a protruding part. The first elastic device connects to the leg via the protruding part to engage the rack. The push button is used for adjusting the height of the leg. To keep the height of the leg, the electronic apparatus further includes a stopper for selectively preventing the first elastic device from deformation.

15 Claims, 8 Drawing Sheets

US 6,789,904 B2

ELECTRONIC APPARATUS WITH HEIGHT-ADJUSTING DEVICE

This application claims priority of Taiwan Patent Application Serial No. 091112658 filed on Jun. 11, 2002.

FIELD OF INVENTION

The present invention relates to an apparatus with a height-adjusting device, and more particularly, to a height-adjusting device for a projector.

BACKGROUND OF THE INVENTION

When projecting an image to a screen, a projector is often placed steadily on a platform, such as a desk. However, the position of the platform, such as the height and the horizontal, will affect the image projected. Sometimes, the image may even become distorted or deformed if the position is not appropriate. Therefore, an adjusting device for improving this kind of problem is usually disposed under the projector.

FIG. 4 shows a projector with a screwed adjusting device of the prior art. The adjusting device 408 of the projector 400 includes a supporting part 410, a rack 404, and a protrusion 414. The supporting part 410 contacts a platform 402 and supports partial weight of the projector 400. Friction exists between the supporting part 410 and the platform 402. As users adjust the extended length of the adjusting device 408, they must provide an external force larger than the friction to effectively screw the adjusting device 408. This is quite laborious. Moreover, users have to screw the adjusting device 408 round and round to slightly increase or decrease the height of the projector 400. It is quite time-consuming.

Another adjusting device as shown in FIG. 5 has been disclosed in Japan Patent Application No. Hei 11-271879. The adjusting device includes a lever 510, a rack 512, and springs 514A, and 514B. The lever 510 is horizontally movably disposed in a housing 502. A protrusion 510A for accepting a pressing force from users is extended from the lever 510 out of the housing 502. A moving part 510B engages the rack 512. In the natural circumstance, the elasticity of the string 514A forces the moving part 510B to engage the rack 512 so as to consolidate the adjusting device 508.

While adjusting the adjusting device 508, users must hold the projector 500 with one hand and push the lever 510 with the other hand to separate the moving part 510B from the rack 512. Then, the elasticity of the string 514B will be strong enough to push out the rack 512. After the height of the adjusting device 508 is adjusted and the lever 510 is loosened, the moving part 510B engages the rack 512 again. The height of the projector 500 is then adjusted.

SUMMARY OF THE INVENTION

The objective of the present invention is to provide an electronic device with a height-adjusting device having a push button for user to adjust its height.

The adjusting device includes a connecting part, a supporting part, a push button, and a first elastic device. The connecting part connects with the housing and includes a groove and a rack. The push button is used for accepting a pressing force. The first elastic device engages the rack. The supporting, for example a leg, further includes a protruding part for connecting the first elastic device to the leg. To steadily keep the height of the leg, the electronic apparatus further includes a stopper for selectively preventing the first elastic device from deformation.

In addition, the adjusting device further includes a second elastic device. Before the second elastic device is pressed, the stopper is in a first position. The first elastic device is unable to deform or to move along with the rack due to the limitation of the stopper. When the push button is pressed, the stopper will be moved to a second position. After the stopper is pressed, the second elastic device deforms, and meanwhile, a deformation space for the first elastic device is generated. The first elastic device becomes able to move along with the rack to adjust the extended length of the leg. While the pressing force of the push button is gone, the elasticity of the second elastic device will force the stopper back to the first position and occupy the deformation space for the first elastic device. Therefore, the first elastic device can not deform or move along with the rack, and will steadily keep the position of the leg.

The advantages and spirits of the present invention will be further understood in reference to the following descriptions and accompanying drawings.

DETAILED DESCRIPTION OF THE INVENTION

Figure 1:
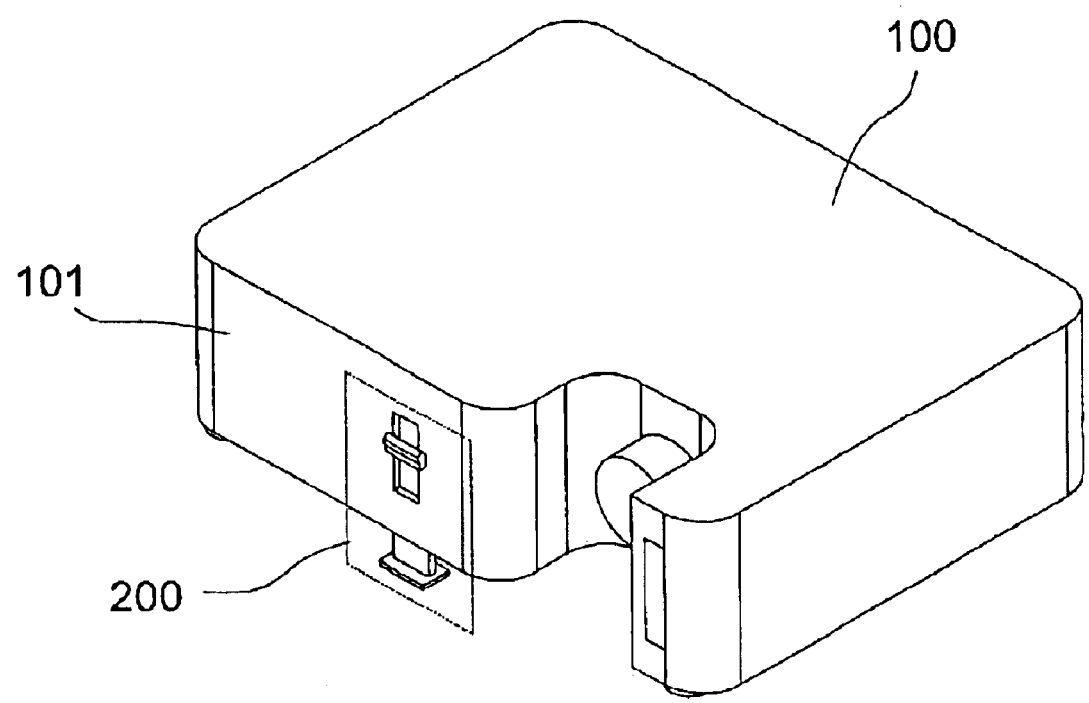
FIG. 1 shows a schematic diagram according to a first embodiment of the present invention.

The present invention provides an electronic apparatus with a height-adjusting device for adjusting the height of the electronic apparatus. FIG. 1 shows a schematic diagram according to a first embodiment of the present invention. The electronic apparatus 100 includes a housing 101. The adjusting device 200 connects to the surface of the housing 101 of the electronic apparatus 100. The electronic apparatus 100 can be a projector.

Figure 2A:
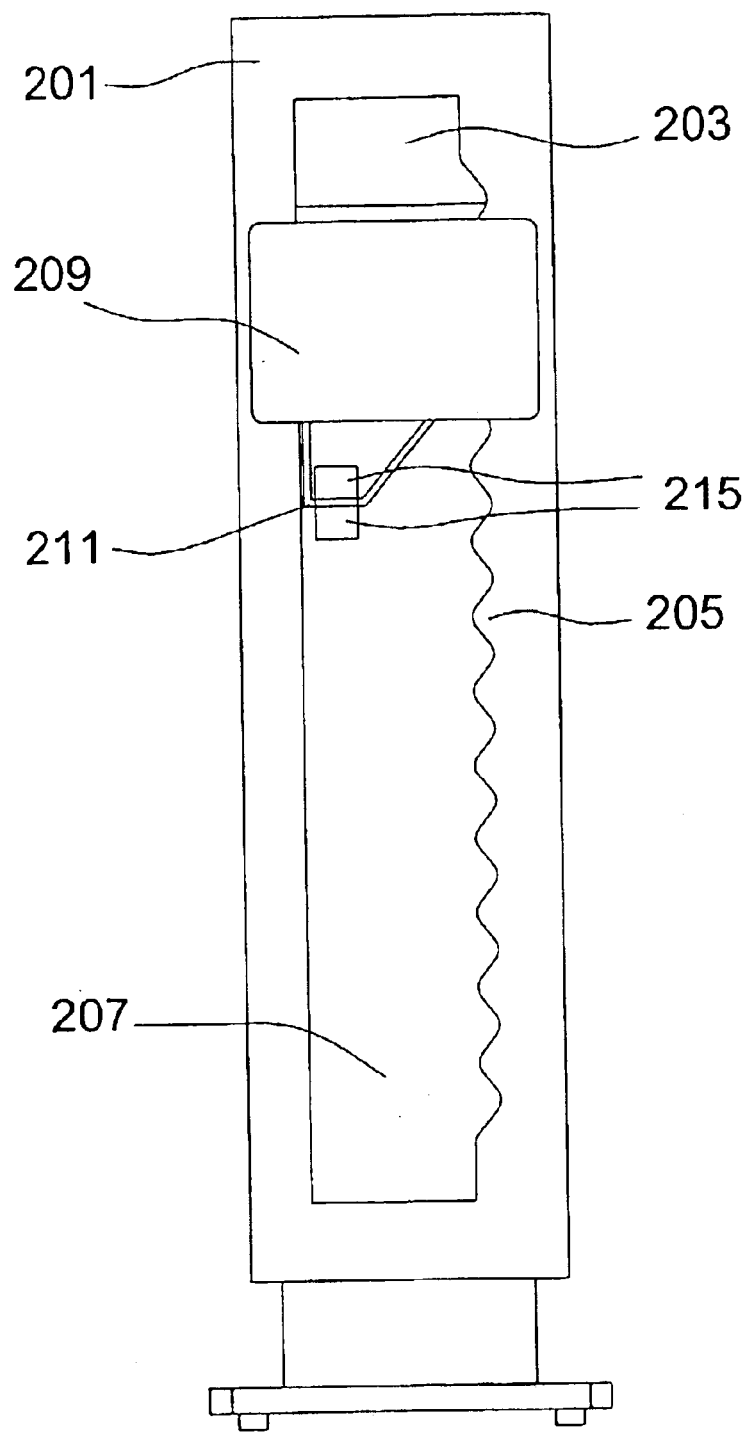
FIG. 2A shows a front-view diagram of the adjusting device according to the first embodiment of the present invention.

FIG. 2A shows a front-view diagram of the adjusting device 200. The adjusting device 200 includes a connecting part 201, a leg 207, a push button 209, and a first elastic device 211. The connecting part 201 connects with the housing 101 and includes a groove 203 and a rack 205.

Figure 2B:
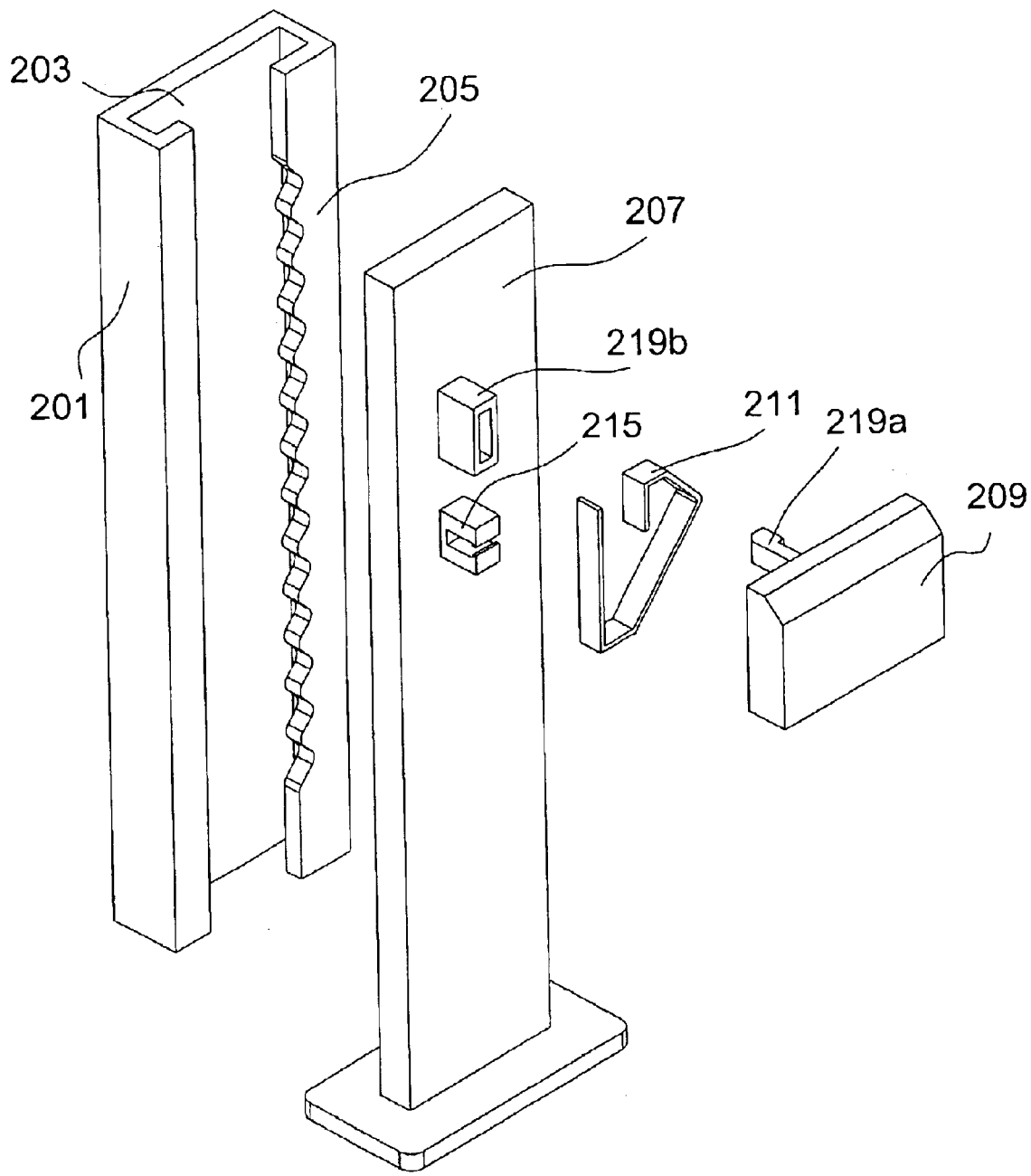
FIG. 2B shows a diagram of the adjusting device according to the first embodiment of the present invention.

FIG. 2B shows a diagram of the adjusting device. The first elastic device 211 is a spring in the form of a bent plate for engaging the rack 205. The leg 207 includes a protruding part 215 for connecting the first elastic device 211 to the leg 207. The push button 209 is used for accepting a pressing force. A lock 219A is used for engaging a slot 219B to mount the push button 209 on the leg 207.

To adjust the height of the electronic apparatus 100, users first press the push button 209, which moves along with the leg 207. The protruding part 215 thereof forces the first elastic device 211 to deform and to move along the rack 205. When the push button 209 is not pressed, the weight of the electronic apparatus 100 can be supported by the engagement between the first elastic device 211 and the rack 205. Therefore, the objective to adjust the length of the leg 207 is achieved.

Generally, the position of the adjusting device connecting to the housing 101 can vary in accordance with user's needs. As shown in FIG. 1, the electronic apparatus 100 is a liquid crystal display projector. The adjusting device 200 is fabricated in the middle of the housing 101 in the front of the electronic apparatus 100. In addition, to facilitate the use of the adjusting device 200, the push button 209 of the adjusting device 200 is exposed on an outside of the housing 101.

On the other hand, when the leg 207 extends out to support the electronic apparatus 100, the leg 207 supports partial weight of the electronic apparatus 100. However, if the weight exceeds a limitation that the leg 207 can bear, the first elastic device 211 will deform and the leg 207 will shorten its length. Thus, to avoid this kind of problem, the weight that the leg 207 bears should be less than minimum force that can deform and move the first elastic device 211.

Figure 2C:
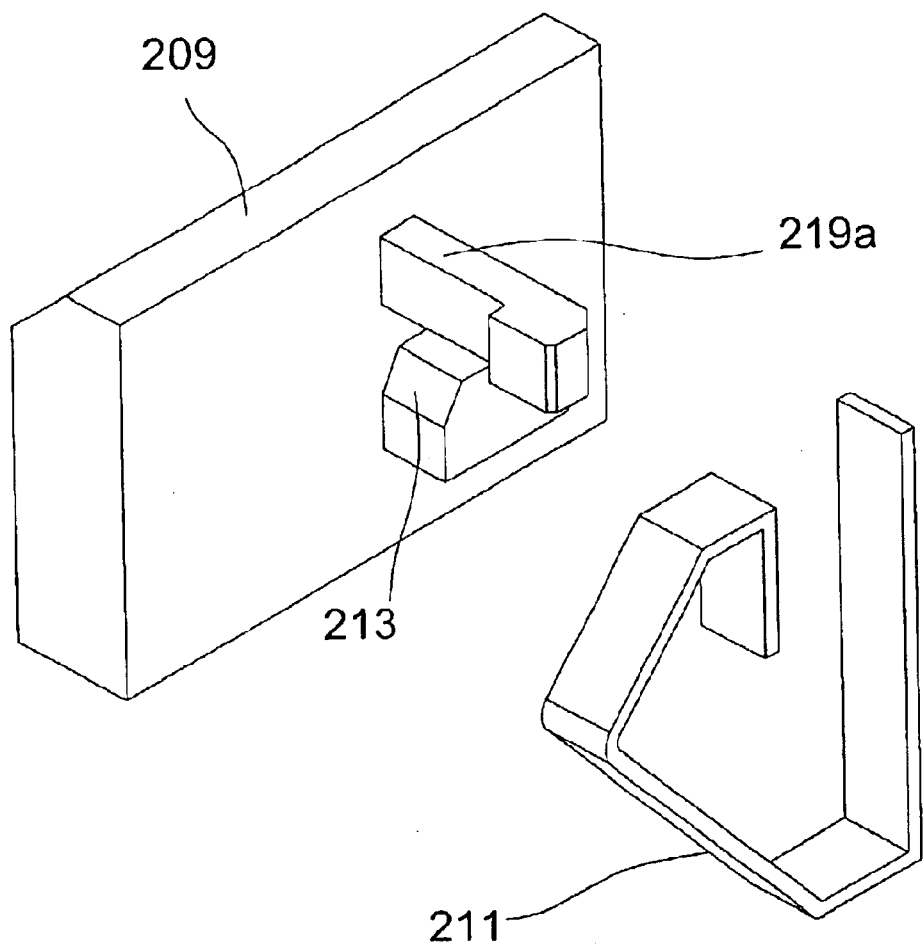
FIG. 2C shows a schematic diagram of the first elastic device according to the first embodiment of the present invention.

FIG. 2C shows a schematic diagram of the first elastic device. To substantially prevent the leg 207 from moving after users adjust its length, the push button 209 further includes a stopper 213. The shape of the stopper 213 will vary according to practical situations. As shown in FIG. 2C, the stopper 213 is a protrusion for selectively preventing the first elastic device 211 from being forced to deform.

Figure 2D:
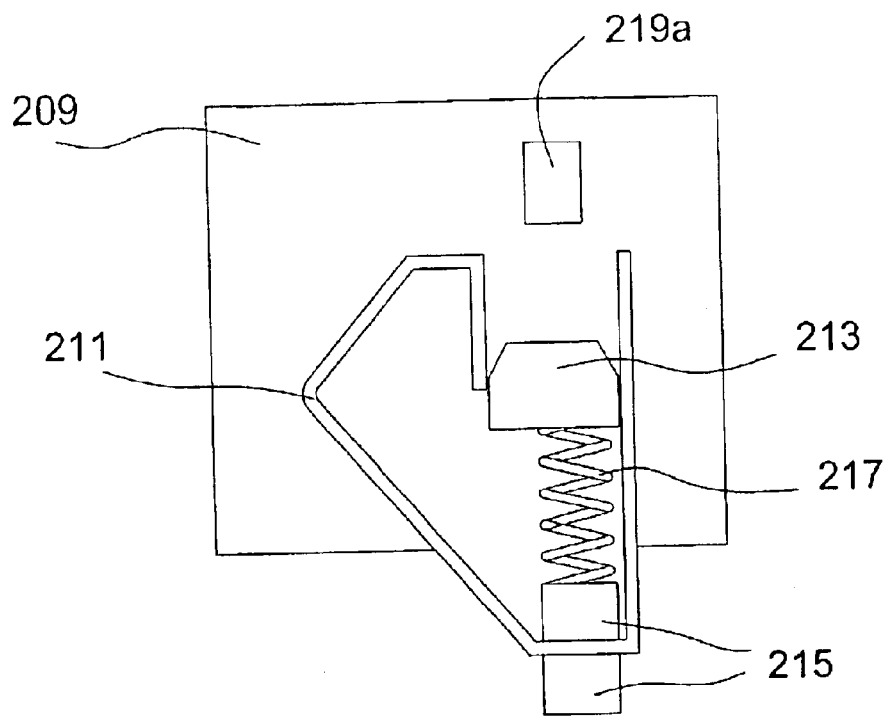
FIG. 2D and FIG. 2E show schematic diagrams of the second elastic device according to the first embodiment of the present invention.
Figure 2E:
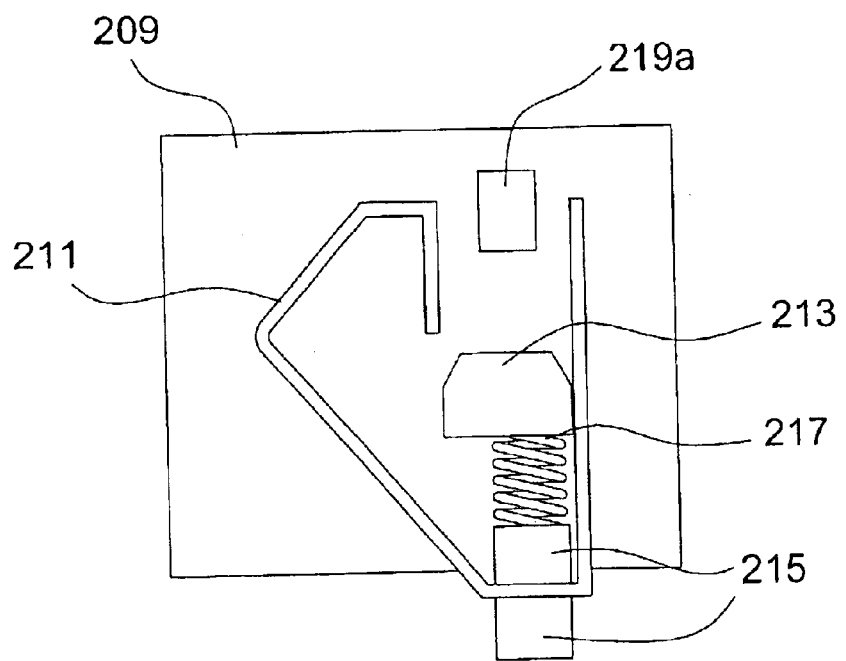

FIG. 2D and FIG. 2E show a cross-section diagram viewed from the leg 207 to the push button 209, illustrating the operation of the second elastic device 217. As shown in FIG. 2D, the adjusting device further includes a second elastic device 217 for repositioning the stopper 213. Before the second elastic device 217 is pressed, the stopper 213 is in the position shown in FIG. 2D, stopping the first elastic device 211 from deforming and moving along with the rack 205.

On the other hand, while the push button 209 is pressed, the stopper 213 will move to the position shown in FIG. 2E. After the stopper 213 is pressed, the second elastic device 217 deforms, and meanwhile, a deformation space for the first elastic device 211 is generated. The first elastic device 211 can deform and to move along with the rack 205 to adjust the extended length of the leg 207. It should be noted that the pressing force should be twice the elasticity of the second elastic device 207.

While the pressing force of the push button 209 is gone, the elasticity of the second elastic device 217 will force the stopper 213 back to the first position 221 and occupy the deformation space for the first elastic device 211. Therefore, the first elastic device 211 can not deform or move along with the rack 205, and will steadily keep the position of the leg 207.

Figure 3A:
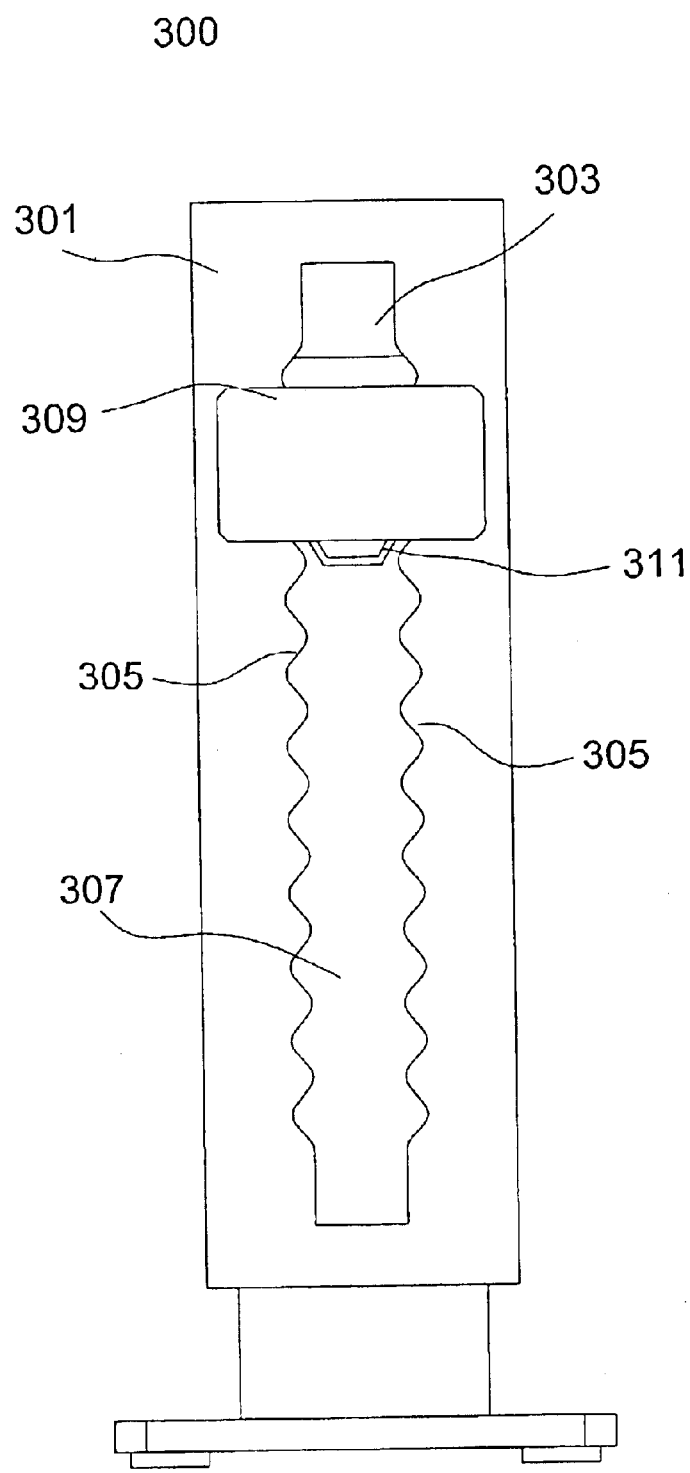
FIG. 3A shows a schematic diagram according to a second embodiment of an adjusting device of the present invention.
Figure 3B:
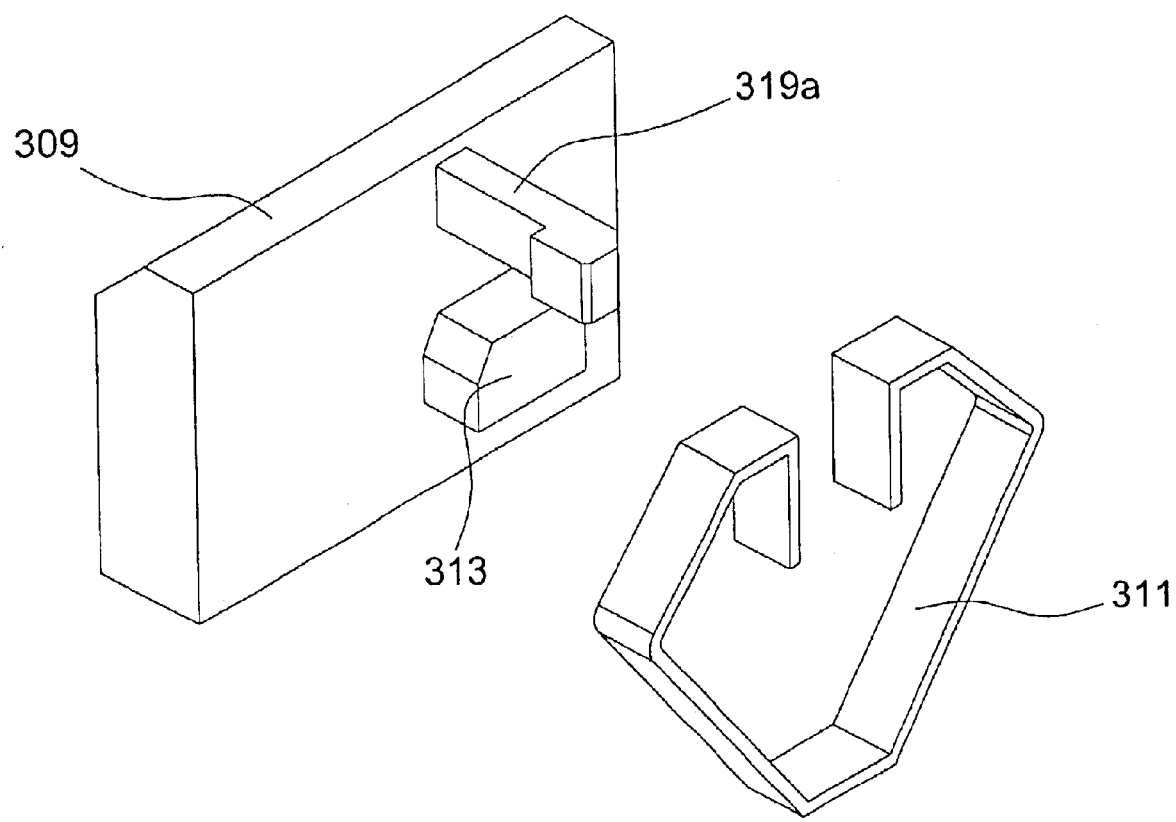
FIG. 3B shows a schematic diagram according to the second embodiment of a first elastic device of the present invention.
Figure 4:
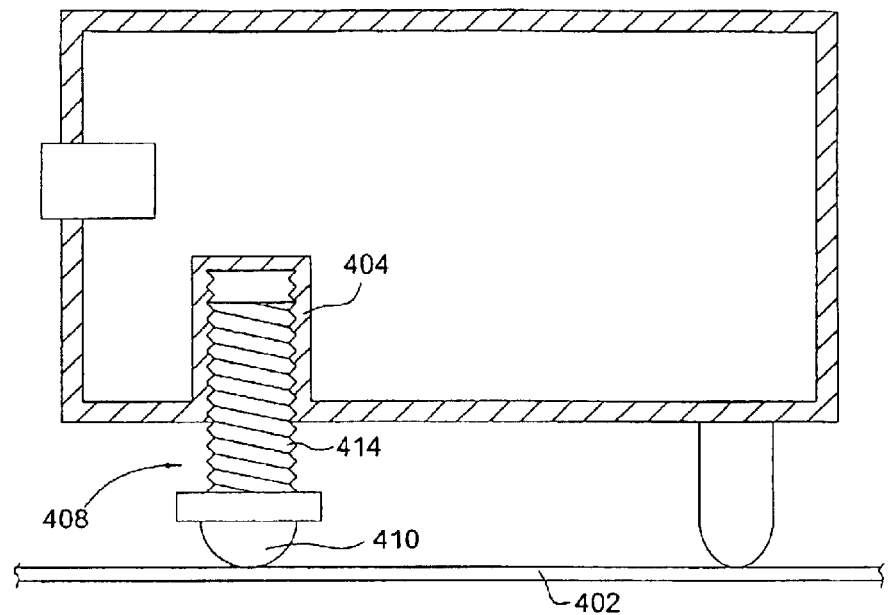
FIG. 4 shows a screwed adjusting device of the prior art.
Figure 5:
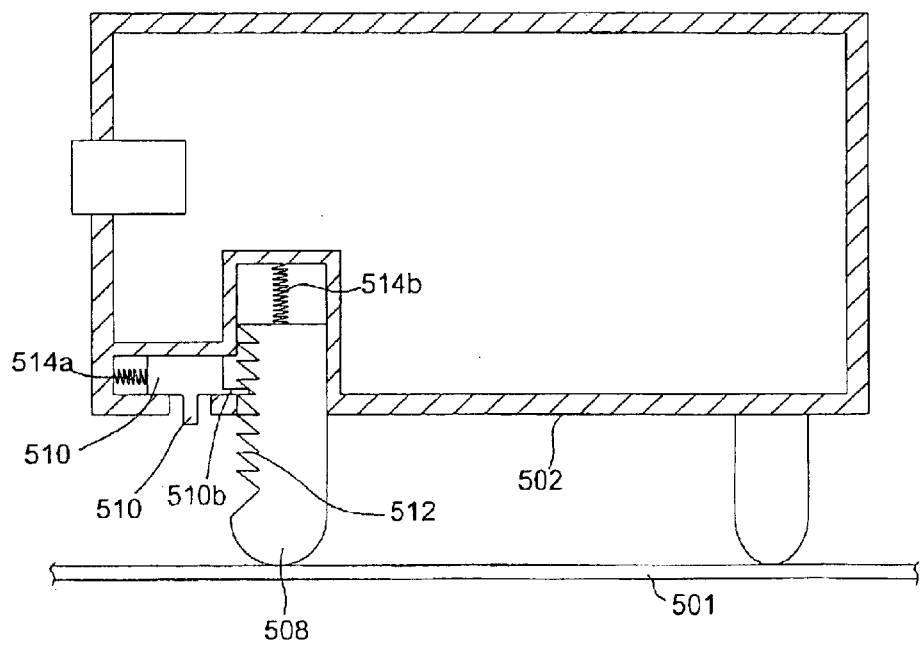
FIG. 5 shows another adjusting device of the prior art.

FIG. 3A shows a schematic diagram according to a second embodiment of an adjusting device 300 of the present invention. The adjusting device 300 includes a connecting part 301, a groove 303, a rack 305, a leg 307, a push button 309, and a first elastic device 311. What is different from the first embodiment is that the rack 305 is designed to be a double rack. FIG. 3B shows a schematic diagram of the elastic device 311 according to the second embodiment. The push button 309 further connects with a stopper 313 and a lock 319A. The first elastic device 311 has to engage both sides of the rack 305 at the same time, as shown in FIG. 3B.

While the invention has been described in connection with what is presently considered to be the most practical and preferred embodiments, it is to be understood that the invention is not to be limited to the discovered embodiments. The invention is intended to cover various modifications and equivalent arrangement included within the spirit and scope of the appended claims.

In the foregoing specification the invention has been described with reference to specific embodiments. It will, however, be evident that various modification and changes may be made to thereto without departing from the broader spirit and scope of the invention. The specification and drawings are, accordingly, to be regarded in an illustrative rather than restrictive sense. Thus, it is intended that the present invention covers the modification and variations of this invention provided they come within the scope of the appended claims and their equivalents.

What is claimed is:

1. An electronic apparatus, having a housing, said electronic apparatus comprising:

a connecting part connecting with said housing and including a groove and a rack;

a leg, movably disposed in said groove, for selectively supporting said electronic apparatus; and a first elastic device for engaging with said rack;

wherein, said first elastic device deforms, after being pressed, for selectively moving along with said rack.

2. The electronic apparatus of claim 1, wherein said electronic apparatus further comprises a push button, connecting with said leg and said first elastic device, for accepting a pressing force.

3. The electronic apparatus of claim 2, wherein said electronic apparatus further comprises a stopper, connecting with said push button, for selectively preventing said first elastic device from deformation.

4. The electronic apparatus of claim 3, wherein said electronic apparatus further comprises a second elastic device, connecting with said stopper, for repositioning said stopper.

5. The electronic apparatus of claim 2, wherein said push button is exposed to the outside of said housing.

6. The electronic apparatus of claim 1, wherein said first elastic device is in the form of a bent plate, for engaging with said rack.

7. The electronic apparatus of claim 1, wherein said electronic apparatus is a projector.

8. An electronic apparatus, having a housing, said electronic apparatus comprising:

a connecting part connecting with said housing and including a groove and a rack;

a leg, movably disposed in said groove, for selectively supporting said electronic apparatus;

a first elastic device for engaging with said rack;

a push button connecting with said leg and said first elastic device; and a stopper, connecting with said push button, for selectively preventing said first elastic device from deformation;

wherein, said first elastic device deforms, after being pressed for selectively moving along with said rack.

9. The electronic apparatus of claim 8, wherein said electronic apparatus further comprises a second elastic device, connecting with said stopper, for repositioning said stopper.

10. The electronic apparatus of claim 8, wherein said push button is exposed to the outside of said housing.

11. The electronic apparatus of claim 8, wherein said first elastic device is in the form of a bent plate, for engaging with said rack.

12. The electronic apparatus of claim 8, wherein said electronic apparatus is a projector.

13. A projector, said projector comprising:
   a housing;
   a connecting part connecting with said housing and including a groove and a rack;
   a leg, movably disposed in said groove, for selectively supporting said electronic apparatus;
   a first elastic device for engaging with said rack;
   a push button connecting with said leg and said first elastic device;
   a stopper, connecting with said push button, for selectively preventing said first elastic device from deformation; and
   a second elastic device, connecting with said stopper, for repositioning said stopper;
   wherein, said first elastic device deforms, after being pressed, for selectively moving along with said rack.

14. The projector of claim 13, wherein said push button is exposed to the outside of said housing.

15. The projector of claim 13, wherein said first elastic device is in the form of a bent plate, for engaging with said rack.

* * * * *